United States Patent Office 3,267,085
Patented August 16, 1966

3,267,085
ETHYLENE-ALLYLALCOHOL COPOLYMERS
Robert P. Shouse and Charles R. Donaldson, Tuscola, Ill., assignors to National Distillers and Chemical Corporation, New York, N.Y., a corporation of Virginia
No Drawing. Filed Jan. 30, 1963, Ser. No. 255,082
12 Claims. (Cl. 260—88.1)

This invention relates to the manufacture of copolymers of ethylene and is particularly concerned with copolymers of ethylene with allyl alcohol. Still more particularly it relates to the manufacture of copolymers of ethylene and allyl alcohol that are especially suited for use in general packaging operations.

In manufacturing films from ethylene polymers, especially films that are to be converted into bags for foodstuffs (fresh produce, candy, nuts, poultry, meat, etc.), soft goods, pharmaceutical and surgical supplies, hardware, toys, and the like, it is important that the film product have, among other characteristics, good mechanical properties, that is, the film must be tough and flexible in order to withstand mechanical shocks and stresses to packages assembled therefrom. It is desirable also that the resin from which the film is produced should have good processing properties, such as, for example, high drawdown rate and heat sealability.

It is known that ethylene can be polymerized with a wide variety of comonomers. In general, however, special synthesis conditions or process equipment have been required to make such copolymers.

It is an object of this invention to provide a process whereby a polyethylene copolymer product can be obtained using the apparatus and techniques already in commercial practice for large-scale production of polyethylene.

It is another object of this invention to provide copolymers of ethylene that have improved mechanical properties.

Another object of the invention is to provide a combination of reactants, reaction conditions, and reaction-influencing substances that gives results in a high pressure process that are quite different from results previously achieved in high pressure polymerization.

Additional objects and advantages will become apparent from the following detailed description:

It has now been found that a resin product having a combination of properties that makes it particularly suited for use in molding or in manufacturing films can be prepared by subjecting ethylene in admixture with a small amount, for example between about 0.1 and about 3.0 weight percent, based on ethylene feed, of allyl alcohol as a comonomer to selected polymerization conditions of elevated temperature and elevated pressure in the presence of a suitable catalyst and, if desired, a suitable catalyst carrier.

The resulting copolymer has a density of about 0.918 to 0.940, a melt index of about 1.0 to 1000, and good processing and mechanical properties. The copolymer may be converted into a product that has increased elongation, haze, and tensile strength and reduced gloss, transmittance, low temperature brittleness, and Vicat softening point, or, at the higher melt indexes, as a blend stock for improved paper coating and printability.

The copolymers produced in accordance with this invention have thus acquired improved processing and mechanical properties without detrimental effect on their other physical properties that make them particularly applicable for use in molding and in film extrusion. For example, the product is an easily handled good-working resin. Since the flow characteristics of the resin are excellent, high-impact film may be produced from it at high production rates. When conventional additives are used, the film has excellent printability; it can be handled without difficulty on automatic bag-making and packaging machinery; and bags made from these films stack without blocking, fill easily, and seal readily and securely. Suitable additives are compounds such as, for example, saturated amides for control of slip and blocking behavior.

The amount of the allyl alcohol comonomer used can very from about 0.1 up to about 3.0 percent by weight, based on the ethylene feed; preferably about 0.5 to about 2.5 weight percent issued.

The catalyst selected for the process of this invention can be any ethylene copolymerization catalyst suitable for use under the reaction conditions embodied herein. Particularly suitable are t-butyl perpivalate, dilauroyl peroxide, t-butyl perbenzoate, t-butyl peracetate, disisopropyl peroxydicarbonate, t-butyl peroxide, and other compounds of comparable free radical activity, and mixtures thereof. The amount of catalyst employed can vary over a wide range of from about 0.001 up to about 5 weight percent, based on the ethylene feed. The catalyst can be used alone or it can be used in the presence of a catalyst carrier, that is, an inert liquid solvent, or diluent such as, for example, benzene, hydrocarbon oils such as mineral oils, kerosenes, saturated hydrocarbons, and the like, and mixtures thereof. The amount of catalyst carrier can range from about 0 up to about 100 weight percent, based on the catalyst solution, and is preferably used in an amount of from about 80 to 99 percent.

As set forth above, the process in accordance with the present invention is carried out at conditions used in the high pressure polymerization of ethylene to prepare high molecular weight polymers. In general, the ethylene admixed with the allyl alcohol comonomer is compressed by multi-stage compressors up to the operating pressure in the polymerization reactor. The catalyst with or without a catalyst carrier and with other additives, if desired, such as for example up to about 5.0 percent by weight, based on the catalyst carrier, of an antioxidant, are injected into the ethylene feed line. In the polymerization reactor the ethylene and the comonomer are copolymerized to form a solid or semi-solid copolymer under pressures within the range of about 17,000 to about 30,000 pounds per square inch, and preferably about 20,000 to about 25,000 pounds per square inch, and at a temperature within the range of about 250° to 500° F., and preferably about 300° to 450° F. The product copolymer and the unreacted gas are then passed through pressure let-down valves into gas separators, which may be one or more in series. The unreacted gas is separated and recycled, if desired, to the ethylene feed line. The copolymer product remaining in the final gas separator is extruded, cooled to room temperature, and subjected to conventional after-treatment steps, such as chopping, shredding, reprocessing, blending, Banburying, or the like.

In order to get the preferred copolymer product, it is essential both that the pressure be within the range of about 17,000 to 30,000 p.s.i. and that the temperature be within the range of about 250° to 500° F. If the pressure is substantially below about 17,000 p.s.i. or substantially above about 30,000 p.s.i. or if the temperature is substantially below about 250° F. or substantially above about 500° F., the resulting copolymer does not have the desired combination of properties.

The relative ease with which this improved polymerization process can be carried out is an obvious advantage. As previously stated there is no need to employ special equipment or reaction techniques in practising the inventive method. Single-stage or multi-stage processes may be utilized, and the polymerization may be carried out as a bulk polymerization or in the presence of solvents, such as benzene, or of dispersants, such as water. The pressure attained may be achieved as usual by pressuring the reactor to the desired degree with ethylene. It will be understood that the usual polymer recovery processes are applicable to the method of this invention; for example, the unreacted ethylene and comonomer may be separated from the molten copolymer in a vessel in which the temperature is essentially that of the reaction and the pressure is reduced to about one tenth that of the reaction. The pressure of the copolymer may be further reduced to about 0 to 10 p.s.i. and the molten copolymer may then be extruded, cooled, and pelletized.

The copolymer of this invention may be molded or converted to a film by any convenient procedure. The film may be blown, flat, or cast. Films may be formed in thicknesses ranging in gauge from about 0.5 mil, suitable for use as garment bags, up to about 10 mils, suitable for use as tarpaulins.

The copolymer may also be used to improve the properties of waxes such as petroleum-derived waxes, either microcrystalline or paraffin; synthetic waxes; etc. Such compositions are expected to have unique properties of toughness, scuff resistance, adhesive strength, ductility, gloss, low water vapor transmission, and processability. The amount of ethylene copolymer blended with the wax may vary over a wide range so that such compositions are useful, for example, as coatings, e.g., for paper, cardboard, cloth, fiber, foil, plastics such as polyolefins, rug backing, and the like; moldings, e.g., molded food containers, disposable containers, etc.; laminates, that is for adhering various substrates together, such as aluminum to cellophane, aluminum to polyolefins such as polypropylene; etc.

If desired, the copolymer of this invention may be used in finely-divided form, that is, where the copolymer has an average size of less than about 10 mesh and preferably within the range of about 150 to 2000 microns. The finely-divided, or powdered, material may be used, for example, in dry form to coat articles by dip coating in either a static or fluidized bed, by powder coating wherein the powder is applied by spraying or dusting, and by flame spraying. In dispersed form, the powders may be applied as coatings by roller coating, spray coating, slush coating, and dip coating to a variety of substrates. The powder also may be foamed and/or used in powder molding techniques; as a paper pulp additive; a mold release agent for rubber; an additive to waxes, paints, or polishes; a binder for non-woven fabrics; and the like. The finely-divided material may be prepared by mechanical grinding, by solution or dispersion techniques, or by any other convenient method.

The invention will be more fully understood by reference to the following examples which are not intended to limit the scope of the invention except as indicated by the appended claims. Unless otherwise specified, all parts are given by weight.

The density of the product is determined, in grams/cc., by a hydrostatic method, that is, by weighing a sample of the copolymer at 23° C. first in air and then in kerosene (ASTM test method D792–60T).

Melt index describes the flow behaviour of a product at a specified temperature and under a specified pressure. It is here determined (ASTM test method D1238–57T) by measuring the flow rate, expressed in grams/10 minutes, on extrusion through an orifice 0.0825 inch in diameter by 0.315 inch long under a pressure of 43.1 p.s.i. at 190° C.

The yield strength is the tensile stress, in pounds per square inch of cross-sectional area of the test specimen, at which the slope of a stress-strain curve first becomes zero (ASTM test method D638–60T).

Torsional stiffness, measured in accordance with ASTM test method D1043, is the value obtained by measuring the angular deflection occurring when the specimen is subjected to an applied torque.

The heat softening point (Vicat softening temperature) is the temperature at which the test specimen becomes too soft to withstand stresses and keep its shape. It is the temperature at which a flat-ended needle of 1 sq. mm. cross section under a load of 1 kg. penetrates 1 mm. into a specimen. The temperature of the sample is increased at a uniform rate (ASTM test method D1525–58T).

Stress crack resistance is determined as follows (ASTM test method D1693–60T): Bent specimens of the plastic having a controlled imperfection on one surface are exposed to the action of a surface-active agent. The proportion of the total number of specimens which crack in a given time is observed.

EXAMPLE I (A) Ethylene admixed with 0.68 percent by weight, based on the ethylene feed, of allyl alcohol as comonomer and 0.14 percent by weight of dilauroyl peroxide, based on the ethylene feed, as catalyst were fed into a conventional autoclave reactor. The temperature inside of the reactor was 338° F. and the reactor pressure was maintained at 20,000 p.s.i. A solid copolymer was continuously produced.

Blown film (1.5 mils thick) of the copolymer was extruded at 325° F. on a 2-inch Egan extruder with a 16:1 L:D ratio and a 2.5:1 blow-up ratio. The extruder output was about 25 pounds per hour. Properties of the product are tabulated below.

Compression molded plaques for testing the mechanical properties of the copolymer were made on an Atlas press at 300° F. The plaques were cut into test specimens suitable for use on conventional instruments for measurement of mechanical properties. Properties of the product are tabulated below.

(B) The procedure of Example I(A) was repeated except that no comonomer was used. The properties of the comparative ethylene homopolymer are tabulated below.

EXAMPLE II

The procedure of Example I(A) was repeated except that the comonomer was 2.0 percent of allyl alcohol, the catalyst was 0.13 percent of t-butyl perpivalate, and the reactor temperature was 356° F. Properties of the product are tabulated below.

EXAMPLE III (A) The procedure of Example I(A) was repeated except that the comonomer was 0.5 percent of allyl alcohol, the catalyst was 1.0 percent of diisopropyl peroxydicarbonate, the reactor temperature was 281° F., and the reaction pressure was 25,000 p.s.i. Results are tabulated below.

(B) The procedure of Example III(A) was repeated except that no comonomer was used. The properties of the comparatve ethylene homopolymer are tabulated below.

EXAMPLE IV

The procedure of Example II was repeated except that the comonomer was 1.09 percent of allyl alcohol, the catalyst concentration was 0.12 percent, and the reactor temperature was 364° F. Properties of the product are tabulated below.

EXAMPLE V

The procedure of Example I(A) was repeated except that the comonomer was 1.1 percent of allyl alcohol, the catalyst was 0.02 percent of t-butyl perbenzoate, and the reactor temperature was 450° F. Results are tabulated below.

EXAMPLE VI (A) The procedure of Example I(A) was repeated except that the comonomer was 0.4 percent of allyl alcohol, the catalyst was 0.2 percent of dilauroyl peroxide, and the reactor temperature was 355° F. Results are tabulated below.

(B) The procedure of Example VI(A) was repeated except that no comonomer was used. Results are tabulated below.

EXAMPLE VII (A) The procedure of Example I(A) was repeated except that the comonomer was 0.2 percent of allyl alcohol, the catalyst was 0.017 percent of t-butyl perbenzoate, and the reactor temperature was 435° F.

(B) The procedure of Example VII(A) was repeated except that no comonomer was used. Results are tabulated below.

*Table*

|  | Results of Example | | | | | | | | | | |
|---|---|---|---|---|---|---|---|---|---|---|---|
|  | IA | IB | II | IIIA | IIIB | IV | V | VIA | VIB | VIIA | VIIB |
| Density | 0.931 | 0.930 | 0.935 | 0.938 | 0.938 | 0.933 | 0.921 | 0.930 | 0.930 | 0.919 | 0.919 |
| Melt Index | 6.7 | 5.7 | 365 | 7.4 | 8.2 | 224 | 475 | 7.4 | 7.4 | 2.0 | 2.0 |
| Elongation, percent | 216 | 460 | 15 | 120 | 100 | 15 | 76 | 114 | 65 | 541 | 540 |
| Yield Strength, p.s.i. | 2,150 | 2,090 | 1,410 | 2,490 | 2,580 | 1,370 | 1,640 | 1,980 | 2,020 | 1,510 | 1,550 |
| Tensile Strength, p.s.i. | 1,520 | 1,540 | 1,400 | 1,540 | 1,560 | 1,370 | 1,440 | 1,380 | 1,390 | 1,710 | 1,570 |
| Modulus, p.s.i. | 37,500 | 41,600 | 38,700 | 45,500 | 49,200 | 40,600 | ........ | 40,500 | 35,500 | 22,500 | 21,700 |
| Torsional Stiffness, p.s.i. | 55,000 | 54,500 | 54,900 | 65,000 | 67,400 | 50,200 | ........ | 72,200 | 72,000 | 28,500 | 32,000 |
| Low Temp. Brittleness, ° C. at F 50 | <−76 | (¹) | >22 | <−76 | −76 | 22 | 1 | <−76 | −68 | <−76 | <−76 |
| Stress Crack Resistance, Hours at F 50 | (²) | <.25 | (²) | (²) | (²) | (²) | (²) | (²) | ........ | 0.65 | ........ |
| Vicat Softening Point, ° C. | 109 | 108.1 | 85.2 | 112.9 | 114.7 | 92.9 | ........ | 104 | 106 | 95.5 | 101 |
| Allyl Alcohol Content of Polymer, percent | 0.31 | 0 | 1.23 | 0.38 | 0 | 0.60 | 0.82 | 2.5 | 0 | 2.0 | 0 |

¹ 2/10 at −76° F.
² Broke in vise.

While there are above disclosed but a limited number of embodiments of the process of the invention herein presented, it is possible to produce still other embodiments without departing from the inventive concept herein disclosed. It is desired, therefore, that only such limitations be imposed on the appended claims as are stated therein.

What is claimed is:

1. A process for copolymerizing ethylene and allyl alcohol which comprises reacting a mixture of ethylene and 0.1 to 3.0 weight percent, based on the ethylene feed, of allyl alcohol at a temperature between about 250° and 500° F. and a pressure between about 17,000 and about 30,000 pounds per square inch in the presence of a free radical copolymerization catalyst.

2. The process of claim 1 wherein the temperature is between about 300° and 450° F. and the pressure is between about 20,000 and 25,000 pounds per square inch.

3. The process of claim 1 wherein the reaction takes place in an autoclave reactor.

4. A process for copolymerizing ethylene and allyl alcohol which comprises reacting a mixture of ethylene and 0.1 to 3.0 weight percent, based on the ethylene feed, of the allyl alcohol at a temperature between about 250° and 500° F. and a pressure between about 17,000 and about 30,000 pounds per square inch in the presence of a free radical copolymerization catalyst in an autoclave reactor.

5. A copolymer of ethylene and allyl alcohol prepared by the process of claim 1.

6. A shaped article produced by molding a copolymer of ethylene and allyl alcohol prepared by the process of claim 1.

7. A film prepared from a copolymer of ethylene and allyl alcohol prepared by the process of claim 1.

8. A copolymer of ethylene and allyl alcohol prepared by the process of claim 4.

9. A process for copolymerizing ethylene and allyl alcohol which comprises reacting a mixture of ethylene and 0.5 to 2.5 weight percent, based on the ethylene feed, of the allyl alcohol at a temperature between about 300° and 450° F. and a pressure between about 20,000 and 25,000 pounds per square inch in the presence of a free radical copolymerization catalyst in an autoclave reactor.

10. A copolymer of ethylene and allyl alcohol prepared by the process of claim 9.

11. A shaped article produced by molding a copolymer of ethylene and allyl alcohol prepared by the process of claim 9.

12. A film prepared from a copolymer of ethylene and allyl alcohol prepared by the process of claim 9.

References Cited by the Examiner

FOREIGN PATENTS 669,771    4/1962    Great Britain.

JOSEPH L. SCHOFER, *Primary Examiner.*

JAMES A. SEIDLECK, *Examiner.*

M. B. KURTZMAN, *Assistant Examiner.*